Sept. 3, 1929.  M. ELLISON ET AL  1,727,006
CAMERA SHUTTER
Filed Sept. 13, 1926

Inventor
Michael Ellison
Edward S. McAuliffe
By Lyon & Lyon
Attorneys

Patented Sept. 3, 1929.

1,727,006

UNITED STATES PATENT OFFICE.

MICHAEL ELLISON AND EDWARD S. McAULIFFE, OF LOS ANGELES, CALIFORNIA, ASSIGNORS, BY MESNE ASSIGNMENTS, TO ELLISON KAMRA COMPANY, A CORPORATION OF DELAWARE.

CAMERA SHUTTER.

Application filed September 13, 1926. Serial No. 135,071.

This invention relates to camera shutters of the two-leaf type and an object of the invention is simplicity of construction and operation.

A further object is to make provision for extreme rapidity of opening and closing of the shutter so as nearly as possible to expose all parts of the sensitized film equally.

The accompanying drawings illustrate the invention:

Figure 1:
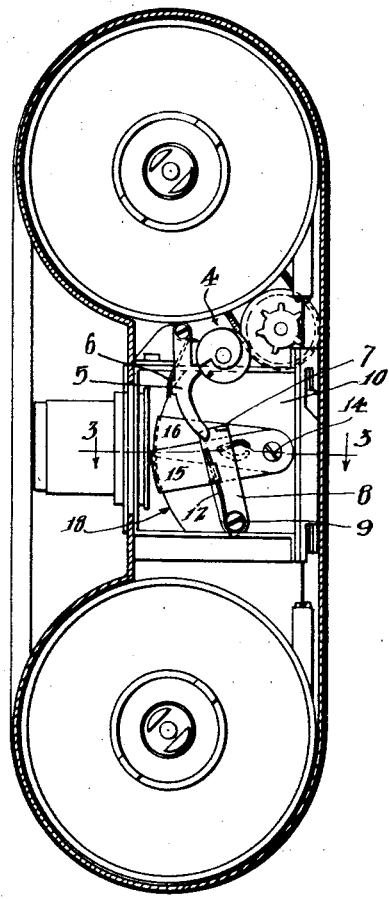
Figure 1 is a view partially in section of a camera provided with a shutter constructed in accordance with the provisions of this invention.

In our copending application for patent for camera, Serial Number 132,434, filed August 30, 1926, we have described in detail and claimed the shutter operating mechanism indicated in general at 4 in Figure 1. It is not necessary to describe the said mechanism in detail herein, it sufficing to state that the arm 5, when the camera is operated, is caused by the spring 6 to be given a quick movement to the right in Figure 1. When this occurs said arm strikes a shoulder 7 on an arm 8 which is pivoted at 9 to one side of a support 10. In this instance the support 10 forms a box having an orifice 11 to permit the light rays to pass to the film.

The arm 8 is normally held retracted in the position shown in Figure 1 by a spring 12, which has one end coiled around the pivot 9 and which rests against an outstanding ear 13 on the arm 8. The spring 12 is placed under compression when assembled and is not as strong as the spring 6, since the actuation of the arm 5 to the right in Figure 1 is relied upon to swing the arm 8 to the right.

Figure 2:
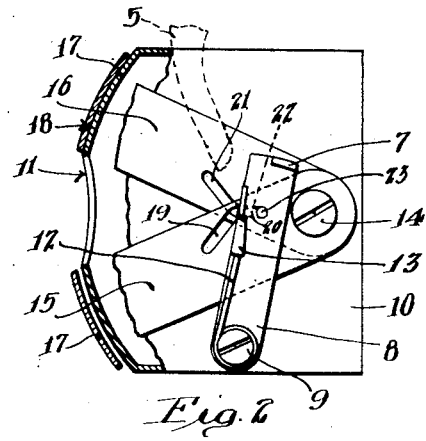
Fig. 2 is an enlarged view of the shutter and its support, partly in section, the shutter members being shown in open position.
Figure 3:
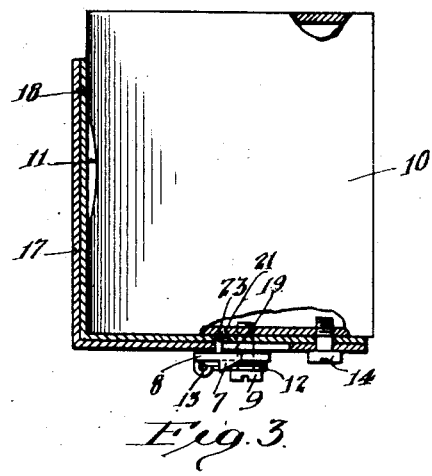
Fig. 3 is an enlarged sectional view mainly on the line indicated by 3—3, Figure 1.

Pivoted at 14 to one side of the support 10 are two L-shaped shutter leaves 15, 16, the pivot 14 being positioned so that the leaf 15 will overlap the leaf 16 when the shutter is in the closed position shown in Figure 1. The front transverse walls 17, 171 of the shutter leaves 15, 16 are arcuate, the center of radius being the pivot 14. Also the front wall 18 of the support 10 is curved to the same radius center as clearly shown in Figure 2. It is the wall 18 that is provided with the orifice 11 and when the shutter leaves are in open position the front wall 171 of the leaf 16 is positioned above the orifice 11 and the front wall 17 of the shutter leaf 15 is positioned below said orifice. One leg of each shutter leaf is provided with an angular cam slot, the two limbs of the slot in the leaf 15 being indicated at 19, 20 and the two limbs of the slot in the leaf 16 being indicated at 21, 22. The forward limbs 19, 21 of the cam slots slant away from one another when the leaves are in the open position shown in Figure 2 and extend toward each other when the leaves are in the closed position shown in Figure 1. The other leg of each shutter leaf extends parallel to the axis of the pivot 14.

The arm 8 carries a stud 23 that projects into the cam slots, the limbs 20, 22 of the cam slots being constructed to permit of the stud 27 moving in an arc about the pivot 9 without entailing motion of the shutter leaves when the stud 23 is moving in the slot limbs 20, 22. The slot limbs 19, 21, are positioned so that when the shutter leaves are in the closed position shown in Figure 1 the stud 23 is positioned at the extreme forward ends of the cam slots.

The invention operates as follows: The arm 5 being actuated in a manner set forth in the above mentioned application will strike the shoulder 7 and suddenly kick the arm 8 to the right from the position shown in Figure 1 to that shown in Figure 2, thus causing the stud 23 to first traverse the slot limbs 19, 21 to force the shutter leaves in open position and then to traverse the slot limbs 20, 22 to the rear ends of said slot limbs. Immediately thereafter the spring 12 retracts the arm 8, causing the stud 23 to move forwardly in the slot limbs 20, 22. As stated above, while the stud 23 is in the slot limbs 20, 22, no movement of the shutter leaves occurs and, accordingly, the duration of exposure of the film depends upon the strength of the spring 12, the force with which the arm 5 strikes the shoulder 7 and the length of the slot legs 20, 22. Thereafter continued forward swinging of the arm 8 causes the stud 23 to move forwardly in the slot limbs 19, 21, thereby actuating the shutter leaves from the open position shown in Figure 2 to the closed position shown in Figure 1.

It will be readily seen from the foregoing that the shutter leaves are quickly actuated into both open and closed positions, thus giving substantially uniform illumination of the sensitive film being exposed in the camera by operation of the shutter.

We claim:

1. A camera shutter comprising two L-shape shutter leaves pivoted to swing on the same axis and provided with cam slots, a pivotally mounted arm provided with a stud engaging in said slots, the slots shaped to effect opening of the shutter leaves when the stud travels in one direction and to effect closing of the shutter leaves when the stud travels in the opposite direction, a spring to move the arm in the last mentioned direction, and means to operate the arm in the first mentioned direction against the pressure of the spring.

2. A camera shutter comprising two shutter leaves pivoted to swing on the same axis and provided with cam slots and provided with transverse walls adapted to overlap when the leaves are closed, a pivotally mounted arm provided with a stud engaging in said slots, the slots shaped to effect opening of the shutter leaves when the stud travels in one direction and to effect closing of the shutter leaves when the stud travels in the opposite direction, a spring to move the arm in the last mentioned direction, and means to operate the arm in the first mentioned direction against the pressure of the spring.

3. A camera shutter comprising two shutter leaves pivoted to swing on the same axis and provided with cam slots and provided with transverse walls adapted to overlap when the leaves are closed, a pivotally mounted arm provided with a stud engaging in said slots, the slots having limbs shaped to effect opening of the shutter leaves when the stud travels in one direction in said limbs and to effect closing of the shutter leaves when the stud travels in the opposite direction in said limbs, the slots having other limbs shaped to maintain the shutter leaves in open position when the stud travels in said other limbs, a spring to move the arm in the last mentioned direction, and means to operate the arm in the first mentioned direction against the pressure of the spring.

4. A camera shutter comprising a support provided with a wall having an orifice, two shutter leaves pivoted to the support to swing on the same axis and provided with cam slots and provided with transverse walls adapted to overlap in front of the orifice when the leaves are closed, an arm pivoted to said support and provided with a stud engaging in said slots, the slots shaped to effect opening of the shutter leaves to uncover the orifice when the stud travels in one direction and to effect closing of the shutter leaves in front of the orifice when the stud travels in the opposite direction, a spring to move the arm in the last mentioned direction, and means to operate the arm in the first mentioned direction against the pressure of the spring.

5. A camera shutter comprising pivotally mounted L-shaped shutter leaves, one leg of each leaf extending parallel to the axis of the pivot, a pivotally mounted arm, means operable by oscillation of the arm to move the leaves apart and to close the leaves together, a spring tending to hold the arm retracted, and means to move the arm against the power of the spring and to then release said arm.

6. A camera shutter comprising pivotally mounted L-shaped shutter leaves, one leg of each leaf extending parallel to the axis of the pivot, a pivotally mounted arm, means operable by oscillation of the arm to move the leaves apart and to close the leaves together, a spring tending to hold the arm retracted, and means disconnected from the arm to strike the arm away from its retracted position.

7. A camera shutter comprising pivotally mounted shutter leaves provided with angular cam-slots, the forward limbs of said slots slanting away from one another when the leaves are separated in open position and said limbs extending toward each other when the leaves are closed together, a stud on the arm projecting into the cam-slots, a spring tending to hold the arm in a position with the stud in the forward ends of the cam-slots, and means to move the arm in a direction to cause the stud to move toward the rear ends of the cam-slots, said means thereafter automatically releasing the arm to permit the spring to retract the arm.

8. A camera shutter comprising pivotally mounted shutter leaves, a movably mounted arm, a spring tending to hold the arm retracted, means operable by the arm in the spring-compressing movement thereof to move the leaves apart, a second movably mounted arm, a spring tending to move the second arm into engagement with the first mentioned arm, and mechanism releasably holding the second arm against being moved by the second mentioned spring, said second mentioned spring being stronger than the first mentioned spring.

9. A camera shutter comprising two pivotally mounted shutter leaves provided with cam slots and provided with transverse walls adapted to overlap when the leaves are closed, the slots registering at one end when the leaves are closed and registering at the opposite end when the leaves are open, a portion of each slot extending at an angle with respect to the path of travel of the slot as the shutter leaf swings on its pivot, a pivotally mounted arm provided with a stud engaging in said slots, a spring yieldingly holding the arm with the stud in the first mentioned end of the slots, and a means to operate the arm against the pressure of the spring.

Signed at Los Angeles, California, this 7 day of September 1926.

MICHAEL ELLISON.
EDWARD S. McAULIFFE.